Figure 1:
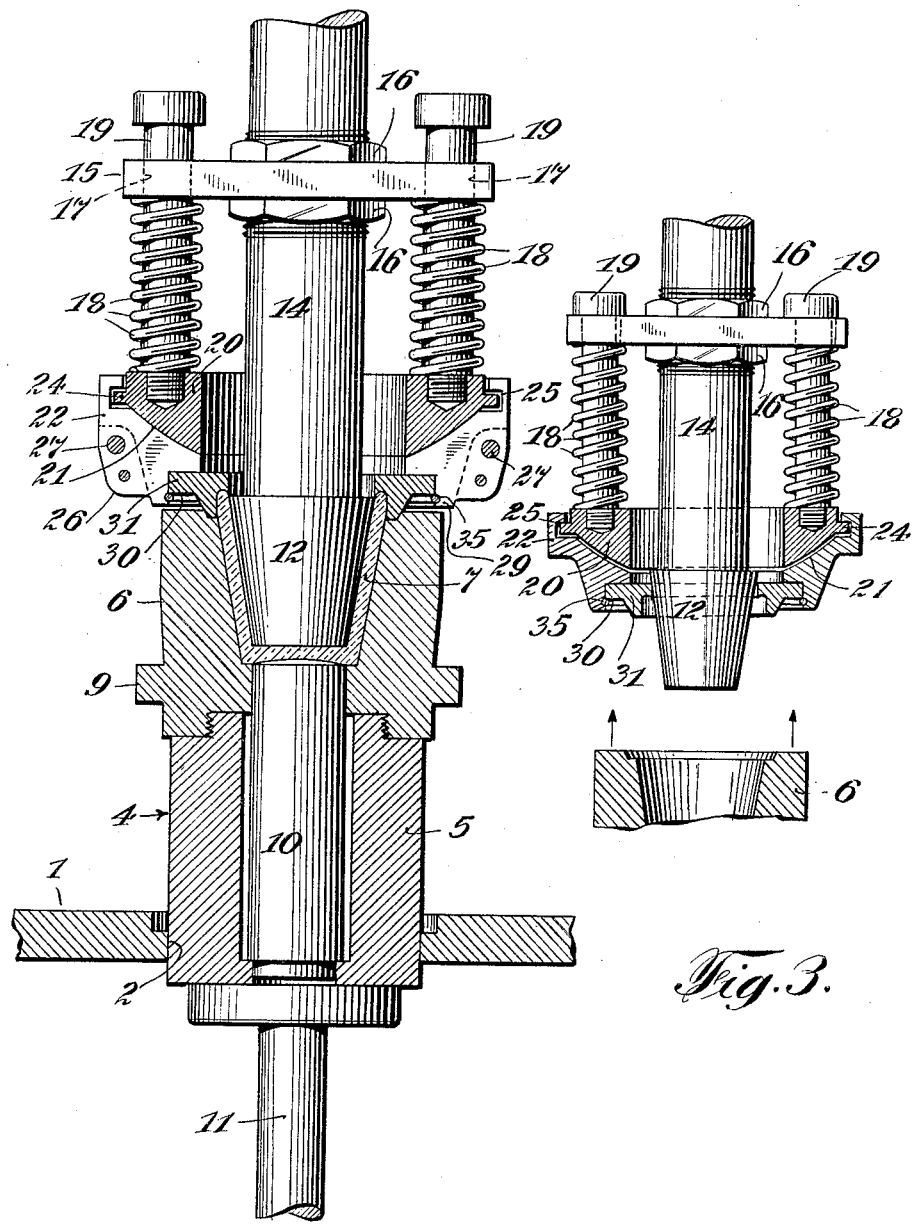

Patented May 16, 1933

1,909,374

UNITED STATES PATENT OFFICE

WILLIAM L. McNAMARA, OF CONNELLSVILLE, PENNSYLVANIA, ASSIGNOR TO CAPSTAN GLASS COMPANY, OF CONNELLSVILLE, PENNSYLVANIA, A CORPORATION OF DELAWARE

MOLD MOUNTING DEVICE

Application filed February 11, 1931. Serial No. 514,927.

The present invention relates to machines for manufacturing glassware and more particularly to a device for positioning ring molds and the like.

In the manufacture of glass containers, such as tumblers and the like, the ware is usually pressed. The machines best suited for this purpose may comprise a blank mold, which forms the body portion of the ware; a ring mold, which forms the upper portion and the rim thereof; and a suitable plunger associated with the ring mold which presses the glass in the molds. To permit a cushioning effect between the molds, the upper mold is usually suspended from the plunger shaft by means of slidable spring retained members. Such a mechanism is illustrated in the patent to Kucera, No. 1,640,944, dated August 30, 1927. During the operation of the machine, the upper and lower molds must be moved into and out of effective positions for each piece of ware formed therein; and since glass machines are operated at a relatively high speed, the supporting and shock absorbing members are subjected to excessive wear. One very troublesome difficulty is occasioned by the parts wearing unevenly, particularly the supports for the ring mold, thereby causing the ring mold to be suspended out of alignment with respect to the blank mold and the plunger. This results in the formation of imperfect ware, which has to be sorted out and thrown away by the manufacturer.

The present invention aims to overcome the above difficulties by providing a device which automatically adjusts the angular position of the ring mold with respect to the plunger and the blank mold associated therewith to effect a perfect mold, even when the cushioning members are out of alignment. In this manner, checks or other irregularities in the ware are minimized or eliminated.

An object of the present invention is to provide a simple inexpensive device for eliminating the above difficulties.

Another object of the invention is to provide a device, readily applicable to the present type of glass machines, to minimize the wear and tear on the molds thereof.

Another object of the invention is to provide a perfect fit between the blank and ring molds to eliminate checks in the ware.

Another object of the invention is to provide a universal joint for automatically adjusting the ring mold with respect to the blank mold to prevent the formation of imperfect ware.

Another object of the invention is to facilitate removal and replacement of the ring mold with respect to the blank mold.

A further object of the invention is to provide a device which increases the efficiency and output of existing machines.

Other and further objects of the invention will be apparent from the following description of the preferred embodiment and various advantages not referred to herein will occur to one skilled in the art upon employment of the invention in practice.

Figure 2:
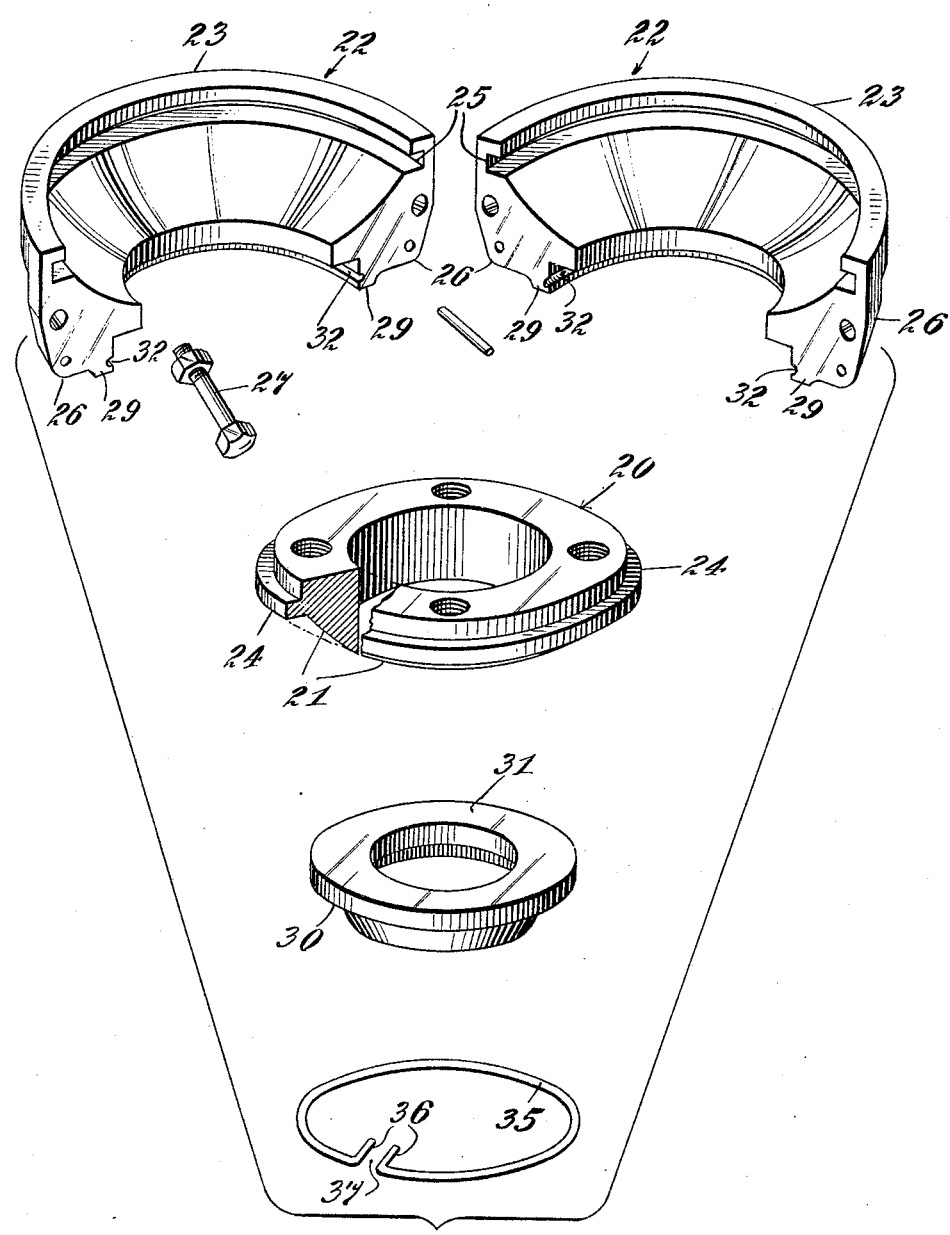

A preferred embodiment has been chosen for purposes of illustration and description and is shown in the accompanying drawings, wherein Fig. 1 is a side elevational view, partly in section, illustrating an embodiment of the present invention applied to a glass molding machine;

Fig. 2 is an enlarged exploded view of the preferred embodiment of the invention; and Fig. 3 is a sectional elevational view, similar to Fig. 1, illustrating the device in operation while the molding members are moving into effective position.

Referring to the drawings there is shown a portion of a fabricating machine for molding glass containers and the like, comprising an intermittently rotating mold table 1 having suitable apertures 2 therein adapted to receive a series of molds 4. The molds preferably comprise bottom members 5 mounted in the apertures 2, and top portions or blank molds 6 adapted to form the body portion of a container 7. The mold members are threaded together so that they are slidable with respect to the table. To facilitate this the upper member 6 is provided with a flange 9 which supports the molds upon the table at a definite height. A plunger 10 closes the bottom of the blank mold 6 and is supported in the lower mold member 5.

The ware 7 may be pressed in various ways such as by lifting the mold 4 upwardly, by means of an elevating ram 11, to project a suitable forming plunger 12 into the blank mold 6, which conforms to the inner contour of the ware. In this instance, the plunger 12 is rigidly suspended above the mold table at the pressing station by a vertical shaft 14 mounted on suitable supporting members, not shown herein. The plunger 12 may also be reciprocated vertically with respect to the mold, if desired, to press the glass.

In the manufacture of tumblers, jelly glasses and the like it is customary to provide a ring mold which forms the upper edge or rim of the ware. This ring mold cooperates with the blank mold and the forming plunger during the pressing operations and is preferably connected to the plunger shaft by suitable supporting members. I have found that during the continuous operation of the molding mechanism, unbalanced strains are imparted to the supporting members which are intended to hold the ring mold in alignment, thus eventually wearing parts thereof and causing the ring mold to be held in improper position with respect to the plunger and the blank mold. A large portion of the imperfect ware caused to be delivered by such machines is attributable to improper alignment of the ring mold caused by wear on the parts.

To eliminate this contingency, the present invention provides a universally movable spring plate for supporting the ring mold properly, even if the supporting members are out of alignment. To effect this result, a yoke 15 is connected to the shaft 14 by means of clamp nuts 16. The yoke has suitable apertures 17 therein for suspending a convenient number of bolts 19 therefrom which are threaded to an annular holding member 20 at the lower ends thereof and are provided with coiled springs 18 extending thereabout for resiliently positioning the holding member 20 with respect to yoke 15. The underside of the member 20 is substantially arcuate as shown at 21 to provide a spherical surface for a suitable socket member 22, while the outer periphery thereof is provided with an outwardly extending flange 24 for supporting the socket member 22, which has a corresponding annular groove 25 on the inner surface thereof. It will be noted that the socket member is also provided with an arcuate surface which snugly envelopes the underside of the member 20 to effect a universal joint. The groove 25 is of sufficient dimensions so that the flange 24 is loosely disposed therein to facilitate oscillation between the ball and socket members. The member 22 is preferably constructed of two semi-circular split members 23 provided with ears 26 for the reception of bolts 27 to assemble them as an entirety about member 20.

At the lower end of the socket members an annular downwardly depending projection 29 is provided adapted to embrace the upper angular portion 30 of a suitable ring mold 31.

The ring mold 31 corresponds preferably to the types of ring mold now used in the manufacture of tumblers and the like, and may be secured to the carrier or split members 22 in any suitable manner. In the preferred embodiment illustrated herein, there is provided an annular groove 32 on the inner surface of the downwardly extending projection 29. A suitable wire 35, substantially circular in cross section is provided with the ends 36 thereof bent substantially radially and inwardly, to provide gap 37 therebetween. By pressing together the ends 36 of the wire, it may be reduced in size sufficiently to be sprung into the groove 32 and to be retained therein by the resilience of the spring wire. In assembling the ring mold, the wire 35 being removed, the ring mold is first placed or nested into the holder or split member 22; thereafter the spring member is constricted and permitted to spring into the groove 32 to engage the lower, outer periphery of the ring mold and hold it securely in place. By means of this construction the ring mold may be removed and replaced very readily without the use of any tools whatever, and is therefore more convenient than the means utilized heretofore, for this purpose.

In the operation of the glass machine illustrated herein, the mold table 1 is rotated intermittently at a definite rate. The mold 4, approaching the pressing station is provided with a charge of molten glass and is moved into position, where the elevating ram 11 raises the mold upwardly as shown in Fig. 1. At this instance, it is extremely important that the ring mold is perfectly aligned with respect to the plunger 12 and the blank mold 6 so that a perfect tumbler is formed. To illustrate this there is shown in Fig. 3 a defective alignment which usually occurs when the suspending bolts 19 are slightly worn. It will be noted that the member 20 is out of alignment, but due to the fact that the ring mold carrier is rotatably connected thereto the ring mold will automatically adjust itself in alignment with the blank mold. The groove 25 affords ample clearance for this adjustment, without straining or wearing parts thereof. Hence, the molds are properly positioned, even under all conditions, to eliminate the formation of imperfect ware.

As the mold 4 is raised further upwardly, the ring mold is seated upon the blank mold and the plunger 12 projects into the blank mold to press out the ware. At this instance, the ring mold carrier is slightly raised against the opposition of the coiled springs 18, thus preventing sudden shocks during the molding operation. While the carrier is raised the bolts 19 are projected above the yoke but drop in position the moment the table mold recedes to its lower position. The ring mold automatically maintains a proper adjustment while leaving the mold, thereby preventing any damage to molded ware during the removal of the plunger and ring mold.

After the ware is pressed the table is rotated so that the succeeding mold is at the pressing station. The ware is ejected from the blank mold at the take-out station by elevating the plunger 10 and is thereafter removed.

It will be seen that the present invention provides a simple inexpensive device readily applicable to existing glass machines for properly aligning the ring mold with respect to the blank mold.

The molds are always in proper relation when in contact with each other thereby preventing checks and other irregularities in the ware. This improves the operation of the glass machines, minimizes losses due to imperfect ware, and increases the efficiency of the machine and the profits of the manufacturer. The parts of the mechanism shown herein are rugged in construction and can readily withstand the rough usage to which they may be subjected.

As various changes may be made in the above embodiment, without departing from the spirit of the invention, it is to be understood that all matter herein is to be interpreted as illustrative and not in a limiting sense.

Having thus described my invention, I claim:

1. In a machine for the manufacture of glassware, the combination of a mold for forming the body portion of the ware, a second mold associated with said first mold for forming the upper portion of the ware, and means comprising ball and socket joint for properly positioning said second mold with respect to said first mold.

2. In a machine of the class described, the combination of a mold, a ring mold associated with said first mold and ball and socket members for supporting said ring mold in proper relation with said first mold.

3. In a machine of the class described, the combination of a mold table, a mold associated with said table, a ring mold supported above said first mold, means for raising said first mold into operative relation with said ring mold, and a ball and socket joint for centering said ring mold with respect to said first mold.

4. In a machine of the class described, the combination of a container mold, a plunger adapted to form a container in said mold, a ring mold associated with said plunger for forming the top of said first mold, and means for moving said ring mold and plunger into operative position to form the ware, said ring mold being operatively connected to said plunger by ball and socket means for permitting adjustment of the angular position of said ring mold with respect to said plunger and container mold during the operation of the machine.

5. In a device of the class described, the combination of a mold for the upper portion of a glass container, a support adapted to be reciprocated, and means for reciprocating said support, said mold being operatively connected to said support by a joint permitting unrestricted movement limited in amount to facilitate adjustment of the mold during the reciprocation thereof.

6. In a device of the class described, the combination of a ring mold for forming the upper portion of glass containers, a resiliently mounted support for said mold, and a ball and socket connection between said mold and said support permitting limited adjustment of the mold.

7. In a device of the class described, the combination of a ring mold, a support for said ring mold, said support having an annular groove therein and a spring member fitting in said groove, said spring member projecting outwardly from said groove to engage and hold said ring mold in place.

8. In a device of the class described, the combination of a mold for the upper part of glass containers, a flange on said mold, a holder for said mold, having a recess therein, and means fitting into said recess and extending beneath said flange to secure said mold to said holder.

9. In a device of the class described, the combination of a ring mold for glass containers, a resiliently mounted support, means for moving said support in a vertical direction, a holding member attached to said support and to said ring mold, the attachment of said holding member to said support being through the intermediation of a loose joint and the attachment of said mold to said support being through the intermediation of an annular spring member expanded radially outwardly.

10. In a device of the class described, the combination of a body mold, a ring mold, means for suspending said ring mold above said body mold, and a ball and socket joint for connecting said ring mold to said means.

11. In a glass machine, the combination of a mold, a mounting member for said mold having a spherical seat therein and an annular recess above said seat, and a supporting member having a spherical surface cooperating with said seat and having a ridge fitting into said recess to permit limited angular adjustment of said mold.

12. In a glass machine of the class described, the combination of a mold, and means for adjustably suspending said mold, said means comprising a spherical member provided with a shoulder and a pair of semicircular members having spherical seats formed to fit said spherical member and grooves for receiving the shoulder of said first member.

13. An adjustable support for a mold comprising in combination a pair of members having cooperating arcuate surfaces adapted to permit relative angular movement between said members, and a radially outwardly extending groove and flange connection between said members adapted to restrict the movement of said members.

14. An adjustable support for a ring mold comprising in combination a member for mounting a ring mold having a spherical seat, a ring mold secured to said member, a supporting member having a spherical surface fitting said seat, and means on said first and second members for loosely connecting said first and second members to permit limited movement therebetween.

15. In a device of the class described, the combination of a body mold, a ring mold adapted to cooperate with said body mold, members for mounting said ring mold, supporting means for said mounting members, and means adapted to reciprocate said supporting means to move said ring mold into operative position with said body mold, said mounting members being connected to and movable with said supporting means by means of a ball and socket joint for centering said ring mold with respect to said body mold.

16. In a device of the class described, the combination of a ring mold for glass machinery, a member for mounting said ring mold having an annular groove therein, resiliently mounted supporting means for raising and lowering said first member, a flange on said supporting means fitting loosely in said groove of said first member, whereby said first member is adapted to move with respect to said supporting member to permit adjustment of the mold with respect to said supporting means.

17. In a device of the class described, the combination of a ring mold having a flange thereon, a holder for said mold, means for moving said holder upwardly and downwardly, and a spring member positioned in said holder for engaging said flange and for retaining said ring mold in said holder.

WILLIAM L. McNAMARA.